United States Patent
Asami

(10) Patent No.: US 8,792,667 B2
(45) Date of Patent: Jul. 29, 2014

(54) THIN AUDIO COMPONENT MOUNTING STRUCTURE, PORTABLE AUDIO DEVICE, CELLULAR PHONE AND METHOD FOR MOUNTING THIN AUDIO COMPONENT

(75) Inventor: Kousuke Asami, Saitama (JP)

(73) Assignee: NEC Corporation, Tokyo (JP)

( * ) Notice: Subject to any disclaimer, the term of this patent is extended or adjusted under 35 U.S.C. 154(b) by 1391 days.

(21) Appl. No.: 12/525,880

(22) PCT Filed: Feb. 6, 2008

(86) PCT No.: PCT/JP2008/051967
§ 371 (c)(1),
(2), (4) Date: Aug. 5, 2009

(87) PCT Pub. No.: WO2008/096794
PCT Pub. Date: Aug. 14, 2008

(65) Prior Publication Data
US 2010/0316241 A1   Dec. 16, 2010

(30) Foreign Application Priority Data

Feb. 7, 2007   (JP) .................................. 2007-028509

(51) Int. Cl.
*H04R 1/02*   (2006.01)
*H04R 9/06*   (2006.01)
*H04M 1/00*   (2006.01)

(52) U.S. Cl.
USPC ..... 381/334; 381/354; 455/569.1; 455/575.1; 379/433.02

(58) Field of Classification Search
CPC ...... H04R 1/2896; H04R 1/2892; H04R 5/02; H04R 1/02; H04R 1/028; H04R 2499/11; H04M 1/03; H04M 1/05; H04M 1/14; H04M 1/6058; H04M 1/6066; H04M 1/6041; H04M 1/725; H04M 2250/02

USPC ................ 381/150, 152, 345–354, 386–388, 381/392–395, 87, 332–336; 455/575.1–575.8, 90.3, 347, 569.1; 379/432, 433.01–433.13

See application file for complete search history.

(56) References Cited

U.S. PATENT DOCUMENTS

| | | | |
|---|---|---|---|
| 6,373,942 B1 * | 4/2002 | Braund | 379/430 |
| 8,204,266 B2 * | 6/2012 | Frigola Munoz et al. | 381/335 |
| 2004/0132511 A1 | 7/2004 | Yamamoto | |

FOREIGN PATENT DOCUMENTS

| | | |
|---|---|---|
| JP | 4-167490 A | 6/1992 |
| JP | 1995-14795 A | 3/1995 |

(Continued)

OTHER PUBLICATIONS

Japanese Office Action for JP2007-028509 mailed on Apr. 17, 2012.

(Continued)

*Primary Examiner* — Xu Mei
(74) *Attorney, Agent, or Firm* — Sughrue Mion, PLLC

(57) ABSTRACT

Even when an audio component is mounted on a non-flat portion such as a level difference portion or a bumpy portion, the audio component is stably fixed so as to improve sound quality without requiring a space for improving the sound quality, such as an exhaust chamber, and without increasing the cost. For this purpose, when a mounting rear face area of the audio component covers the non-flat portion on a substrate on which the audio component is mounted, the audio component is fixed on the substrate with a strength retaining member in the shape of a thin sheet provided therebetween for cancelling a level difference against a rear face of the audio component in the non-flat portion.

11 Claims, 3 Drawing Sheets

(56) References Cited

FOREIGN PATENT DOCUMENTS

| | | |
|---|---|---|
| JP | H09-018982 A | 1/1997 |
| JP | 2000049423 A | 2/2000 |
| JP | 2001246323 A | 9/2001 |
| JP | 2002118892 A | 4/2002 |
| JP | 2002299852 A | 10/2002 |
| JP | 2004040621 A | 2/2004 |
| JP | 2005317386 A | 11/2005 |
| JP | 3119321 U | 2/2006 |
| WO | 9825438 A1 | 6/1998 |

OTHER PUBLICATIONS

International Search Report for PCT/JP2008/051967 mailed Apr. 22, 2008.

European search report for EP08710863.5 dated Jun. 22, 2012.

* cited by examiner

F I G. 2
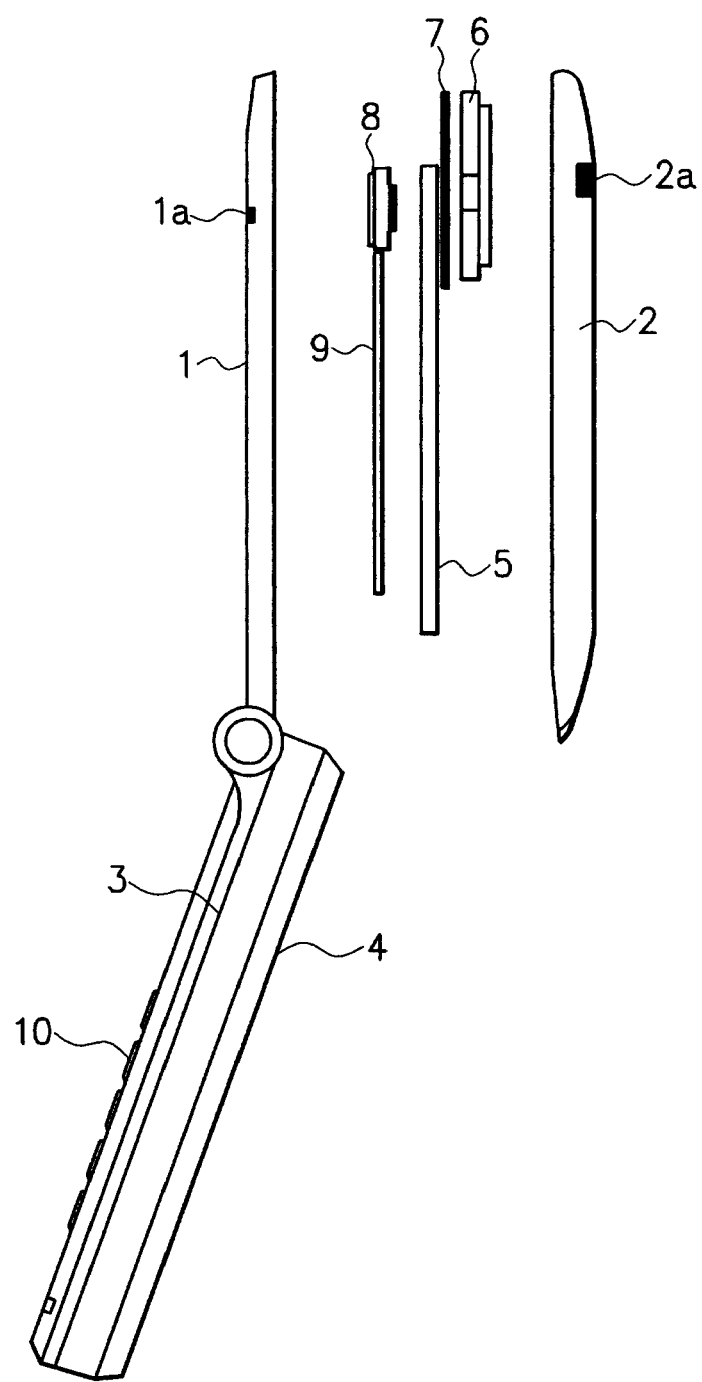

F I G. 3
(A) WITH SPACER NOT USED
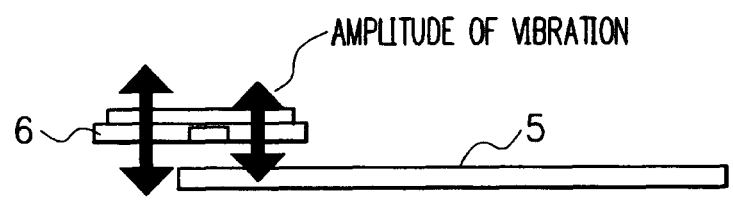
(B) WITH SPACER USED
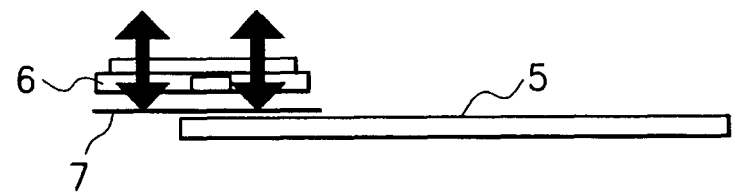

US 8,792,667 B2

THIN AUDIO COMPONENT MOUNTING STRUCTURE, PORTABLE AUDIO DEVICE, CELLULAR PHONE AND METHOD FOR MOUNTING THIN AUDIO COMPONENT

This application is the National Phase of PCT/JP2008/051967, filed Feb. 6, 2008, which is based upon and claims priority to Japanese Patent Application No. 2007-028509, filed on Feb. 7, 2007, the disclosure of which is incorporated herein in its entirety by reference.

TECHNICAL FIELD

The present invention relates to a thin audio component mounting structure in which a thin audio component, such as a thin speaker including a bare internal vibration portion to be used in, for example, a cellular phone, is mounted, a portable audio device, a cellular phone and a method for mounting a thin audio component.

BACKGROUND ART

Recently, cellular phones are developing in various aspects for attaining a small thickness and compactness, high performance and the like. Due to the requirements for a small thickness and cost reduction of such cellular phones, there is an increasing trend in employment of a bare type vibration portion for reducing the number of components and attaining a small thickness. In general, an exhaust chamber made of a mold or the like in which sound is rectified is used for vibration control in producing sound of a speaker, or alternatively, a speaker is mounted on a flat portion for attaining stable vibration to realize uniform sound radiation, but in such a case, it is necessary to provide a prescribed space within the device. Therefore, it is extremely difficult, in pursuing compactness, for a speaker vibration portion to attain stable vibration and uniform sound radiation.

In one of audio units used in various electronic equipment such as cellular phones and information terminal devices, a frame-shaped spacer is adhered onto the outer circumference on the top face of a casing and a flexible sheet is adhered onto the top face of the spacer, so as to form a prescribed closed space between the casing and the sheet, and sound of a speaker is transmitted to the closed space (see, for example, Patent Document 1).

Alternatively, in a key switch structure precedently filed by the present Applicant, a metal dome for attaining electric conductiveness when pressed is disposed correspondingly to each switch contact on a switch substrate, and the metal dome is fixed on the switch substrate with an adhesive PET sheet (see, for example, Patent Document 2).

Patent Document 1: Japanese Laid-Open Patent Publication No. 2004-40621
Patent Document 2: Japanese Laid-Open Patent Publication No. 2005-317386

DISCLOSURE OF THE INVENTION

Problems to be Solved by the Invention

In recent cellular phones, however, while a small thickness and compactness are strongly desired, components used therein are required to retain equivalent or higher performance. Furthermore, there is a similar tendency in characteristics/performance attained not as a component but when it is mounted, and there still remain a large number of problems in mounting, which are difficult to overcome.

In particular, with respect to mounting of a speaker, since there are a large number of restrictions in the mounting position, it is not easy to overcome problems for exhibiting essential ability of the component of, for example, output with stable characteristics.

In other words, a speaker mounted in a cellular phone employing the aforementioned related art of the invention has the following problems:

As a first problem, with respect to mounting of a speaker in a cellular phone, it is difficult to mount a rear face of the speaker on a flat plane having no level difference, and therefore, it is necessary to consider to dispose the rear face on a stable portion as much as possible within restriction in design, and if flatness is attained by using a mold or the like, the cost is increased. When a level difference cannot be avoided, it is extremely difficult for a vibration portion provided within the speaker to stably attain vibration, namely, to stably produce sound.

As a second problem, with respect to mounting of a speaker in a cellular phone, although there are increasing demands for a small thickness, in order that a vibration portion obtains stable vibration as a speaker, namely, stably produces sound, it is indispensable to use an exhaust chamber adjusted for uniform sound radiation with a component used for improving flatness, which is contrary to the requirement of a small thickness.

In the technique described in Patent Document 1 mentioned above, a speaker is held in an opening communicating with the closed space formed by the frame-shaped spacer, and therefore, it does not consider stable mounting of the rear face of the speaker when a stable fixing portion cannot be secured.

In the technique described in Patent Document 2 mentioned above, the metal dome used for realizing a switch is fixed on the substrate in a plate shape with the adhesive PET sheet, and therefore, it does not consider stable mounting of the rear face of a speaker when a stable fixing portion cannot be secured.

The present invention was devised in consideration of these circumstances, and an object of the invention is providing a thin audio component mounting structure, a portable audio device, a cellular phone and a method for mounting a thin audio component in which an audio component can be stably fixed for improving sound quality without requiring a space, such as an exhaust chamber, for improving the sound quality and without increasing the cost even when the audio component is mounted on a non-flat portion, such as a level difference portion or a bumpy portion.

Means for Solving the Problems

In order to achieve the object, in the thin audio component mounting structure of this invention, a mounting rear face area of an audio component covers a non-flat portion on a substrate on which the audio component is mounted, and the audio component is fixed on the substrate with a strength retaining member in the shape of a thin sheet provided therebetween for cancelling a level difference against a rear face of the audio component in the non-flat portion.

Furthermore, the portable audio device of this invention includes the aforementioned thin audio component mounting structure of the invention.

Furthermore, the cellular phone of this invention includes the aforementioned thin audio component mounting structure of the invention.

Furthermore, in the method for mounting a thin audio component of this invention, when an audio component is mounted on a substrate such that a mounting rear face area of the audio component covers a non-flat portion, the audio component is fixed on the substrate with a strength retaining member in the shape of a thin sheet provided therebetween for cancelling a level difference against a rear face of the audio component in the non-flat portion.

Effects of the Invention

As described so far, according to the present invention, even when an audio component is mounted on a non-flat portion, such as a level difference portion or a bumpy portion, the audio component can be stably fixed without requiring a space, such as an exhaust chamber, for improving sound quality and without increasing the cost, and therefore, the sound quality can be improved.

BEST MODE FOR CARRYING OUT THE INVENTION

Now, one exemplary embodiment in which a thin audio component mounting structure, a portable audio device, a cellular phone and a method for mounting a thin audio component according to the present invention are applied to mounting of a thin speaker in a cellular phone will be described with reference to the accompanying drawings.

The outline of the present embodiment will be first described.

In the present embodiment, with respect to a speaker used in a cellular phone, and more particularly, a thin speaker including a bare internal vibration portion, when there is a level difference behind a mounting portion of a speaker, the level difference is made flat by using a spacer or the like for attaining rectification in the speaker vibration portion, so as to provide a mounting method in which sound quality can be improved by improving distortion in a low range.

FIGS. 1 and 2 are respectively diagrams illustrating the external appearance of a speaker mounting portion of a folding cellular phone and an exploded view thereof. A speaker 6 of a type with a bare vibration portion used for informing an incoming call or mail by producing a phone melody or for amplifying sound is mounted.

The speaker 6 is mounted, on its rear face side, on a non-flat portion, and a spacer 7 in a size sufficient for covering the speaker 6 is adhered onto a device substrate 5. Owing to this spacer 7, a side behind the rear face of the speaker 6 is made flat. Since it is thus made flat, when the vibration portion of the speaker 6 is vibrated for producing sound, stable vibration can be attained and distortion can be improved particularly in a low range with a larger amplitude, and thus, the sound quality can be improved.

In this manner, according to the present embodiment, with respect to a speaker used in a cellular phone, when a mounting rear face area covers a level difference or the like in an unstable shape, a spacer is adhered to a rear face of the speaker so as to cancel the level difference, and as a result, when a vibration portion of the speaker is vibrated for producing sound, stable vibration can be obtained so as to attain uniform sound radiation. In a low range with a larger amplitude in particular, the distortion can be largely improved by making the vibration thus stable, and therefore, the sound quality can be easily improved even in a small space used.

Next, the cellular phone according to the present embodiment will be described in detail with reference to FIGS. 1 and 2.

FIGS. 1 and 2 are respectively diagrams illustrating the external appearance of a speaker mounting portion of a folding cellular phone and an exploded view thereof.

A reference numeral 1 denotes an upper casing, a reference numeral 2 denotes an upper cover, a reference numeral 3 denotes a lower casing, and a reference numeral 4 denotes a lower cover. A reference numeral 5 denotes a device substrate, which is connected to a lower device substrate, which is not illustrated in the drawings, disposed inside the lower casing 3 and the lower cover 4 through a connector, a flexible substrate and the like.

A reference numeral 6 denotes a speaker (an audio component) used for informing an incoming call or mail by producing a phone melody or for amplifying sound, and a cushion for sticking the upper cover 2 and the speaker 6 fast to each other is adhered onto the speaker 6. It is assumed that the speaker 6 is connected to the device substrate 5 through a connector. It is noted that this speaker 6 is of a thin type with a bare vibration portion.

A reference numeral 7 denotes a spacer (a strength retaining member) in the shape of a thin PET film, which has a size sufficient for covering a mounting rear face area of the speaker 6 and is adhered onto the device substrate 5 with a double-sided adhesive tape.

It is noted that the mounting rear face area of the speaker 6 is a portion of the speaker 6 in contact with a plane part of a substrate when the speaker 6 is mounted in a sufficiently large area on the plane substrate.

A reference numeral 8 denotes a receiver provided on a face of the device substrate 5 opposing the upper casing 1 or provided on the upper casing 1. A reference numeral 9 denotes a display part such as a display provided on the device substrate 5, a reference numeral 10 denotes an operation part such as a keyboard incorporated in the lower casing 3 to be used for operating the device substrate 5, a reference numeral 1a denotes a sound hole for the receiver 8 provided on the upper casing 1, and a reference numeral 2a denotes a sound hole for the speaker 6 provided on the upper cover 2.

In this manner, when the speaker 6 is mounted on a non-flat portion of the device substrate 5, namely, it is mounted on the device substrate 5 such that the edge of the device substrate 5 disposed behind the mounting rear face area of the speaker 6 in the present embodiment, the speaker 6 is fixed on the device substrate 5 with the spacer 7 in a thin sheet shape provided so as to cancel a level difference in the non-flat portion against the rear face of the speaker 6.

Next, the operation of the cellular phone of the present embodiment will be described with reference to FIGS. 1 through 3.

FIG. 3 illustrates the amplitudes of vibrations obtained with or without the spacer provided in the speaker mounting portion of a folding cellular phone. FIG. 3(A) illustrates a comparative example in which the spacer is not provided, and FIG. 3(B) illustrates the present embodiment in which the spacer is provided.

As illustrated in FIG. 3(A), when the spacer 7 is not provided in the mounting rear face area of the speaker 6 used in the cellular phone, there is a level difference behind a mounting portion of the speaker 6 at the edge of the device substrate 5, and hence, the vibration is small in a portion having a small space behind and large in a portion having a large space behind as illustrated in the drawing with arrows. As a result, the vibration is unstable, the sound clearness is unstable and the sound quality is poor due to distortion.

On the other hand, when the mounting rear face area of the speaker 6 used in the cellular phone is fixed on the substrate with the spacer provided as illustrated in FIG. 3(B), the level difference behind the mounting portion of the speaker 6 can be cancelled, and therefore, stable vibration can be obtained by the speaker, the sound flow can be rectified, and sound with good quality and little distortion can be easily realized in a low range with large vibration in particular.

As described so far, according to the present embodiment, the following effects can be attained.

As the first effect, in the case where there is a level difference or bumpy portion behind the mounting rear face area of the speaker 6, when the spacer for cancelling the level difference against the rear face of the speaker is adhered onto the rear face of the speaker, sound is rectified and vibration load can be made uniform. As a result, the vibration portion disposed within the speaker can attain stable vibration so as to stably produce sound, and therefore, a cellular phone good at reproduction of sound in a low range in particular can be easily provided.

As the second effect, in the case where there is a level difference or bumpy portion behind the rear face of the speaker, when the spacer for cancelling a level difference against the rear face of the speaker is adhered onto the rear face, the harmful effect of the level difference or bumpy portion can be removed merely by additionally using the spacer without employing a speaker including an exhaust chamber, and therefore, a cellular phone good at reproduction of sound with good quality in a low range in a small space used can be easily provided inexpensively.

In this manner, according to the present embodiment, as a mounting method for a speaker used in a cellular phone, a speaker of a bare type vibration portion in particular is used, and when there is a level difference or bumpy portion behind a rear face portion of the speaker, a spacer for cancelling the level difference is adhered onto the rear face of the speaker, so as to rectify vibration and attain stable vibration. Thus, distortion can be improved in a low range with a large amplitude, and the sound quality can be easily improved in a small space used.

Furthermore, even when an audio component is mounted on a non-flat portion such as a level difference portion or a bumpy portion, the audio component can be stably fixed without requiring a space for improving the sound quality such as an exhaust chamber or a space for fixing and without increasing the cost, and therefore, the sound quality can be easily improved without affecting the cost and the space in this mounting method for a speaker.

It is noted that the aforementioned embodiment is merely a preferable embodiment of the invention, and the invention is not limited by the embodiment but can be variously modified on the basis of the technical concept of the invention.

For example, although the shape/size of the spacer 7 is described as the size sufficient for covering the speaker 6 in the aforementioned embodiment, the same effects can be attained with a spacer with a size merely corresponding to the size of a level difference or bumpy portion.

Specifically, in the case where there is a level difference like the edge described in the aforementioned embodiment behind the mounting rear face area of the speaker 6, the vibration caused by the speaker can be made uniform as illustrated in FIG. 3(B) as long as a spacer is provided in a position and a size covering positions away from the level difference, namely, the edge of the substrate, by a distance of at least 0.5 mm both in a direction toward the substrate and an outward direction from the substrate, and thus, the same effects as those of the aforementioned embodiment can be attained.

Furthermore, in the case where there is a bumpy portion behind the mounting rear face area of the speaker 6, the same effects as those described in the aforementioned embodiment can be attained as long as a spacer is provided in a position and a size at least covering a part of the bumpy portion in contact with the mounting rear face area.

The spacer is not limited to the aforementioned PET film as long as it has sufficient strength and is in a shape of a sheet not twisted when adhered, and any of various materials in the shape of a thin sheet may be used.

The thickness of the spacer may be particularly preferably approximately 0.1 mm but is not limited to this and may be any of various thicknesses.

The device substrate 5 may be of any of various types, and may be a substrate made of a rigid material or a flexible substrate.

Although the speaker is mounted in a cellular phone in the aforementioned embodiment, a portable audio device is not limited to the cellular phone as far as the speaker is mounted therein, and the present invention is similarly applied to, for example, a PDA (Personal Digital Assistant) terminal or any of various portable equipment including a speaker mounted in a main body thereof.

Furthermore, the present invention can exhibit remarkable effects particularly when it is applied to mounting of a speaker of a bare type vibration portion or a speaker of a low-profile type.

Moreover, although the audio component mounted on the substrate is the thin speaker in the aforementioned embodiment, the audio component to be mounted is not limited to this, but the same effects as those described in the embodiment can be attained even when, for example, a receiver or a microphone is mounted on a non-flat portion of a substrate.

In this manner, in the thin audio component mounting structure according to the present invention, a mounting rear face area of an audio component covers a non-flat portion on a substrate on which the audio component is mounted, and the audio component is fixed on the substrate with a strength retaining member in the shape of a thin sheet provided therebetween for cancelling a level difference against a rear face of the audio component in the non-flat portion.

A part of the mounting rear face area of the audio component is preferably disposed on a flat portion on the substrate and another part thereof is preferably disposed in a position outside an edge of the substrate, and the strength retaining member is preferably provided in such a manner as to cover positions of the mounting rear face area away from the edge of the substrate by a distance of at least 0.5 mm in a direction toward the substrate and an outward direction from the substrate.

The mounting rear face area of the audio component may be disposed in a position covering a bumpy portion of the substrate, and the strength retaining member may be provided in such a manner as to cover at least a part of the bumpy portion in contact with the mounting rear face area.

The strength retaining member is preferably provided in such a manner as to cover the whole mounting rear face area.

The audio component is preferably a thin speaker having a structure in which an internal vibration portion is bare.

Furthermore, the portable audio device of the present invention includes the aforementioned thin audio component mounting structure of the present invention.

Furthermore, the cellular phone of the present invention includes the aforementioned thin audio component mounting structure of the present invention.

Moreover, in the method for mounting a thin audio component of the present invention, in mounting an audio component on a substrate with a mounting rear face area of the audio component covering a non-flat portion, the audio component is fixed on the substrate with a strength retaining member in the shape of a thin sheet provided therebetween for cancelling a level difference against a rear face of the audio component in the non-flat portion.

A part of the mounting rear face area of the audio component is preferably disposed on a flat portion on the substrate and another part thereof is preferably disposed in a position outside an edge of the substrate, and the strength retaining member is preferably provided in such a manner as to cover positions of the mounting rear face area away from the edge of the substrate by a distance of at least 0.5 mm in a direction toward the substrate and an outward direction from the substrate.

The mounting rear face area of the audio component may be disposed in a position covering a bumpy portion of the substrate, and the strength retaining member may be provided in such a manner as to cover at least a part of the bumpy portion in contact with the mounting rear face area.

The strength retaining member is preferably provided in such a manner as to cover the whole mounting rear face area.

BRIEF DESCRIPTION OF THE DRAWINGS

FIG. 2 is an exploded side view of the cellular phone.

FIG. 3 illustrates vibration obtained by a speaker of a comparative example (A) and the exemplary embodiment (B).

Figure 1:
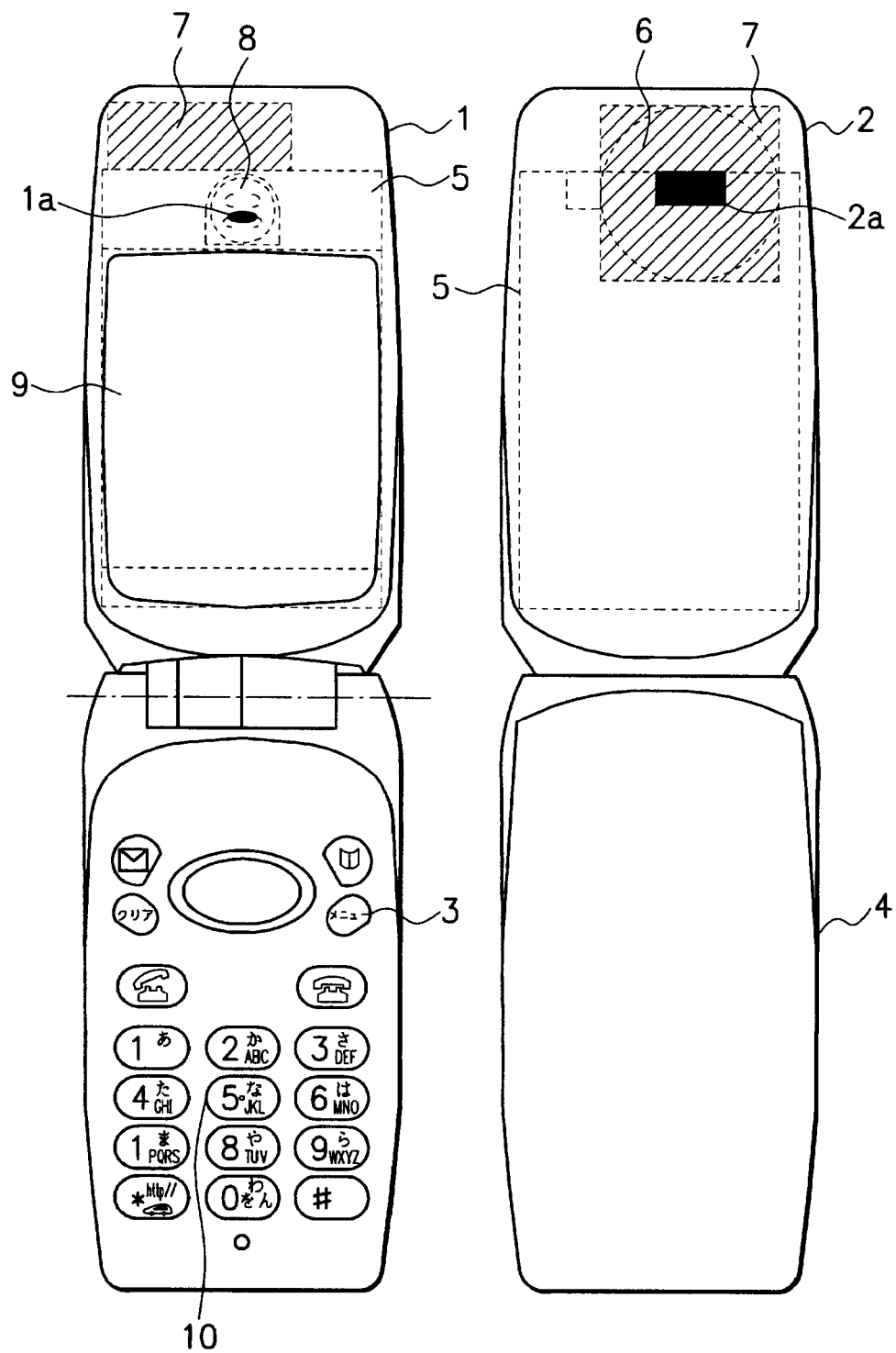
FIG. 1(a) is a front view and FIG. 1(b) is a rear view of a cellular phone according to an exemplary embodiment of the invention.

DESCRIPTION OF REFERENCE NUMERALS 1 upper casing
1a sound hole for receiver
2 upper cover
2a sound hole for speaker
3 lower casing
4 lower cover
5 device substrate
6 speaker (exemplary audio component)
7 spacer
8 receiver
9 display part
10 operation part

What is claimed:

1. A thin audio component mounting structure in a cellular phone, which a mounting rear face area of an audio component covers a non-flat portion on a substrate on which the audio component is mounted, and in which the audio component is fixed on the substrate with a strength retaining member in the shape of a thin sheet provided therebetween for cancelling a level difference against a rear face of the audio component in the non-flat portion,
wherein a part of the mounting rear face area of the audio component is disposed on a flat portion on the substrate and another part thereof is disposed in a position outside an edge of the substrate.

2. The thin audio component mounting structure according to claim 1, wherein
the strength retaining member is provided in such a manner as to cover positions of the mounting rear face area away from the edge of the substrate by a distance of at least 0.5 mm in a direction toward the substrate and an outward direction from the substrate.

3. The thin audio component mounting structure according to claim 1,
wherein the mounting rear face area of the audio component is disposed in a position covering a bumpy portion of the substrate, and
the strength retaining member is provided in such a manner as to cover at least a part of the bumpy portion in contact with the mounting rear face area.

4. The thin audio component mounting structure according to claim 2,
wherein the strength retaining member is provided in such a manner as to cover the whole mounting rear face area.

5. The thin audio component mounting structure according to claim 1,
wherein the audio component is a thin speaker having a structure in which an internal vibration portion is bare.

6. A portable audio device comprising the thin audio component mounting structure according to claim 1.

7. A cellular phone comprising the thin audio component mounting structure according to claim 1.

8. A method for mounting a thin audio component in a cellular phone, in which, when an audio component is mounted on a substrate such that a mounting rear face area of the audio component covers a non-flat portion, the audio component is fixed on the substrate with a strength retaining member in the shape of a thin sheet provided therebetween for cancelling a level difference against a rear face of the audio component in the non-flat portion,
wherein a part of the mounting rear face area of the audio component is disposed on a flat portion on the substrate and another part thereof is disposed in a position outside an edge of the substrate.

9. The method for mounting the thin audio component according to claim 8, wherein
the strength retaining member is provided in such a manner as to cover positions of the mounting rear face area away from the edge of the substrate by a distance of at least 0.5 mm in a direction toward the substrate and an outward direction from the substrate.

10. The method for mounting the thin audio component according to claim 8,
wherein the mounting rear face area of the audio component is disposed in a position covering a bumpy portion of the substrate, and
the strength retaining member is provided in such a manner as to cover at least a part of the bumpy portion in contact with the mounting rear face area.

11. The method for mounting the thin audio component according to claim 9,
wherein the strength retaining member is provided in such a manner as to cover the whole mounting rear face area.

\* \* \* \* \*